United States Patent [19]

Briles

[11] 4,370,081

[45] Jan. 25, 1983

[54] BLIND FASTENER WITH WORK GRIPPING HEAD

[76] Inventor: Franklin S. Briles, 1301 Dolphin, Corona Del Mar, Calif. 92625

[21] Appl. No.: 300,173

[22] Filed: Sep. 8, 1981

Related U.S. Application Data

[63] Continuation of Ser. No. 66,933, Aug. 16, 1979, abandoned.

[51] Int. Cl.³ .................... F16B 13/06; F16B 39/22
[52] U.S. Cl. ........................ 411/43; 411/54; 403/404
[58] Field of Search ............... 411/43, 39, 40, 34, 411/54, 55, 44, 361, 360; 403/404, 408, 405

[56] References Cited

U.S. PATENT DOCUMENTS

| | | | |
|---|---|---|---|
| 3,222,977 | 12/1965 | Vaughn | 411/39 |
| 3,443,474 | 5/1969 | Blakeley et al. | 411/41 |
| 3,643,544 | 2/1972 | Masa | 411/43 |
| 3,849,964 | 11/1974 | Briles | 403/408 |
| 3,921,364 | 11/1975 | Briles | 403/405 |
| 4,016,703 | 4/1977 | Champoux et al. | 403/404 |
| 4,127,345 | 11/1978 | Angelosanto et al. | 411/354 |
| 4,202,242 | 5/1980 | Champoux et al. | 411/361 |

*Primary Examiner*—Ramon S. Britts
*Attorney, Agent, or Firm*—William W. Haefliger

[57] ABSTRACT

A tubular fastener has an axially extending tubular shank receivable in a work bore and an annular head receivable in forcible engagement with the work material forming a counterbore. The fastener also is characterized by:

(a) the head having an annular end face, a first forwardly tapered section located forwardly of that end face to forcibly engage the work counterbore and a second forwardly tapered section located forwardly of the first section, the taper angularity of the second section substantially exceeding the taper angularity of the first section, (b) a stem extending through the tubular shank and head, and (c) structure responsive to retraction of the stem toward the head end of the fastener to expand at the opposite end of the fastener and axially retain the fastener in position with the head first section forcibly engaging the counterbore, in non-rotating condition.

3 Claims, 4 Drawing Figures

BLIND FASTENER WITH WORK GRIPPING HEAD

This is a continuation of application Ser. No. 66,933, filed Aug. 16, 1979, now abandoned.

BACKGROUND OF THE INVENTION

This invention relates generally to fasteners, and more particularly concerns blind fastener connection to work, in such manner as to provide excellent corrosion resistance and high shear strength of work panels.

Blind fasteners are commonly characterized as employing a tubular shank and a tapered annular head, as well as a stem which is retractable at the exposed or front side of the work in order to expand locking structure at the "blind" or unexposed side of the work. Such expansion serves to lock the fastener to the work. Any excess exposed extent of the stem may then be severed. Use of such has not always been advisable, because of the larger holes required in the work due to increased diameter of the head.

Also, in most instances excessive recessing of the fastener heads was considered necessary for engagement by tooling holding the head and shank against rotation upon rotary retraction of the threaded stem. In addition, prior blind fasteners tended to loosen and fall-out of position in response to structural vibration, resulting in decreased fatigue life and destruction of sealing engagement of the head and countersink bore, so that corrosive fluid can then gain access to the interface, corroding the connection. Also, prior blind fasteners are in general not applicable to original design installation in shear load applications where thin panels are used, because required head heights result in countersink recesses that are near the knife edge condition, reducing shear bearing area which results in lower fatigue strength and loosening of the fastener.

SUMMARY OF THE INVENTION

It is a major object of the invention to provide simple apparatus and method overcoming the above problems and difficulties. Basically, the invention enables use of a blind fastener which does not require excess removal of work or skin material to receive the fastener head, so that work fatigue and shear strengths are not compromized.

The invention is embodied in a tubular fastener having an axially extending tubular shank receivable in a work bore and an annular head receivable in forcible engagement with the work material forming a counterbore, the improvement combination comprising:

(a) the head having an annular end face, a first forwardly tapered section located forwardly of said end face to forcibly engage the work counterbore and a second forwardly tapered section located forwardly of the first section, the taper angularity of the second section substantially exceeding the taper angularity of the first section, (b) a stem extending through the tubular shank and head and (c) means responsive to retraction of the stem toward the head end of the fastener to expand at the opposite end of the fastener and axially retain the fastener in position with the head first section forcibly engaging the counterbore.

As a result, reduced drilling out of the work to receive the blind fastener head decreases the countersink overall diameter, whereby the work is not undesirably weakened; also, the interference engagement of the head first tapered section with the work produces radial compression and peripheral tension which tend to increase fatigue strength and shear strength of the work, to prevent loosening of the joint, and reduce the problem of fall-out; resistance to corrosive fluid access between the work and head is provided by virtue of such interference; and the connection of the fastener to the work is strengthened. Such fasteners may be used as originally designed-in fasteners, or as replacement fasteners.

Further objects and advantages include the provision of a blind fastener having a stem rotatable during its retraction to apply torque transmitted to the shank and head, the head first section having sufficient forcible engagement with the counterbore as to develop friction to block rotation of the head; the provision of one form of fastener wherein a ring is deformed at the blind end of the fastener, and another form wherein a reduced thickness end portion of the shank is deformed at that blind side; the provision of head taper angularities and interfit dimensions as respects the tapered counterbore as to assure that the head does not rotate in position; and the provision of method steps to secure the blind fastener in position. Also, use of high bearing areas at two spaced locations in the upper sheet and one location in the lower sheet or structure keeps the fastener axis normal to the work during attempted shear of the work. This is important where no interference is developed between the shank and the work.

These and other objects and advantages of the invention, as well as the details of illustrative embodiments, will be more fully understood from the following description and drawings, in which:

DRAWING DESCRIPTION

DETAILED DESCRIPTION

Figure 1:
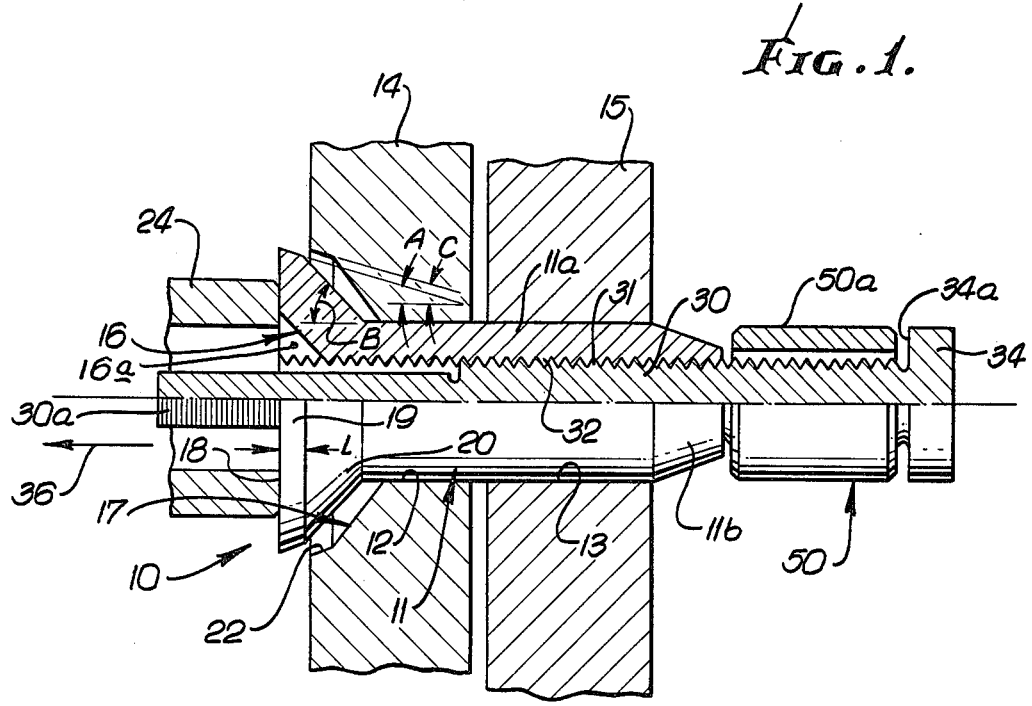
FIG. 1 is a side elevation, partly in section, showing a blind fastener embodying the invention after it has been partly inserted in a work structure bore.
Figure 2:
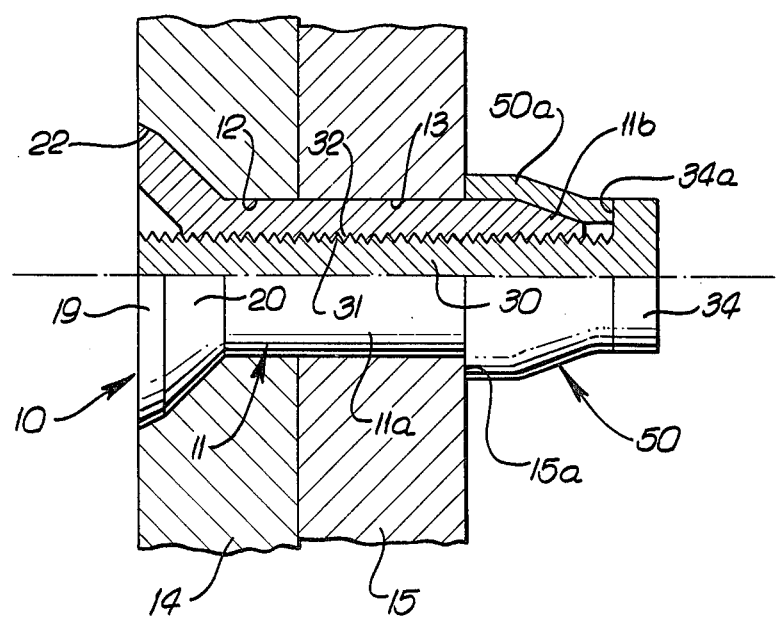
FIG. 2 is a view like FIG. 1, but showing the fastener after complete insertion.

In FIGS. 1 and 2, the tubular fastener 10 has an axially extended tubular shank 11 receivable in bores 12 and 13 formed by work panels or sheets 14 and 15 to be interconnected. The fastener also has an annular head 16 receivable in forcible engagement with work material forming a tapered counterbore generally indicated at 17, and which is typically coutersunk. The fastener may for example consist of metal such as alloy steel, aluminum or titanium, or aluminum or titanium alloys, or Monel; also the work such as aircraft skins may for example consist of metal such as aluminum or titanium, or aluminum or titanium alloys, or other light metal alloys.

The head 16 has an end face 18, a first forwardly tapered section 19 located immediately forwardly of the end face, and a second forwardly tapered section 20 located forwardly of the first section. The taper angularity B of the second section substantially exceeds the taper angularity A of the first section, so that when the shank is partially inserted into the work bore as seen in FIG. 1 (with interference fit as will be described), and an impact is imparted to, or pressure exerted on, the head rear face, the head becomes seated as seen in FIG. 2.

A tubular striker to impact the head is indicated generally at 24. The construction of the fastener may be such that it becomes fully seated, as seen in FIG. 2, in response to one or more impacts imparted by such a striker, whereby there is no necessity for repeatedly striking the head, thereby greatly reducing the noise level in assembly areas. The tubular shank 11 typically includes an elongated primary section 11a extending forwardly of the head second section 20, and a secondary section 11b which extends forwardly of the section 11a, and is forwardly tapered to be used for radially outwardly expanding the rearward portion 50a of the ring 50 for retaining the rivet in work panel connecting position as seen in FIG. 2.

For best results, and in regard to the fastener, the taper angularities A and C are typically about the same and may vary between 2° and 15°; when A is about 2°, the length L of the first section 19 is about 0.140 inches; when A is about 15° the length L is about 0.010 inches (i.e. the lesser the angle A, the greater the length L) and these two coordinates (2° and 0.140 inches, and 15° and 0.010 inches) define a line in a rectangular coordinate system which relates L to A.

In addition, in FIG. 2 the head first section 19 typically has interference engagement with the counterbore surface 22 everywhere along the length of section 19, the total amount of such interference being within the range of about 0.001 and 0.010 inch; and the shank primary section 11a typically may have interference engagement with the bores 12 and 13, the total amount of such interference likewise being within the range of about 0.000 and 0.008 inch.

The fastener of FIG. 1 also includes a stem 30 extending through the tubular shank and annular head. It is shown as externally threaded at 31, threadably interengaging the bore thread 32 of the shank, whereby the stem may be retracted relative to the shank in response to rotation of the stem, after seating of the head as in FIG. 2, such seating providing a frictional interlock to resist rotation of the head and shank. Means is provided to be responsive to such retraction of the stem to expand at the protruding end of the fastener, for axially retaining the fastener in position with the head first section 19 frictionally locked to the counterbore 22. In this regard, the frictional interlock at 22 is sufficient to resist rotation of the head and shank, to resist or block rotation of the head and shank in response to torque application to the stem acting to retract the stem and radially expand ring 50. Accordingly, a corrosion proof seal is provided at 22, and the frictional interlock between 19 and 22 assists completion of the connection. In some cases, a holding device such as a Phillips recess shown at 16a is provided in the head to assist in preventing spin; but the required size of that recess is greatly reduced (strengthening the head) because of the interlock at 22. The head diameter is also enabled to be reduced.

The end of the stem remote from the head carries a flange 34 defining an annular shoulder 34a. The latter, upon rearward retraction of the stem, displaces the ring 50 toward and over the cam surface 11b on the shank to expand the ring, as seen in FIG. 2. Note that the outer diameter of shoulder 34a is less than the outer diameter of the head section 19. Arrow 36 indicates the direction of retraction of the stem, gripped at its reduced diameter, threaded end 30a.

Figure 3:
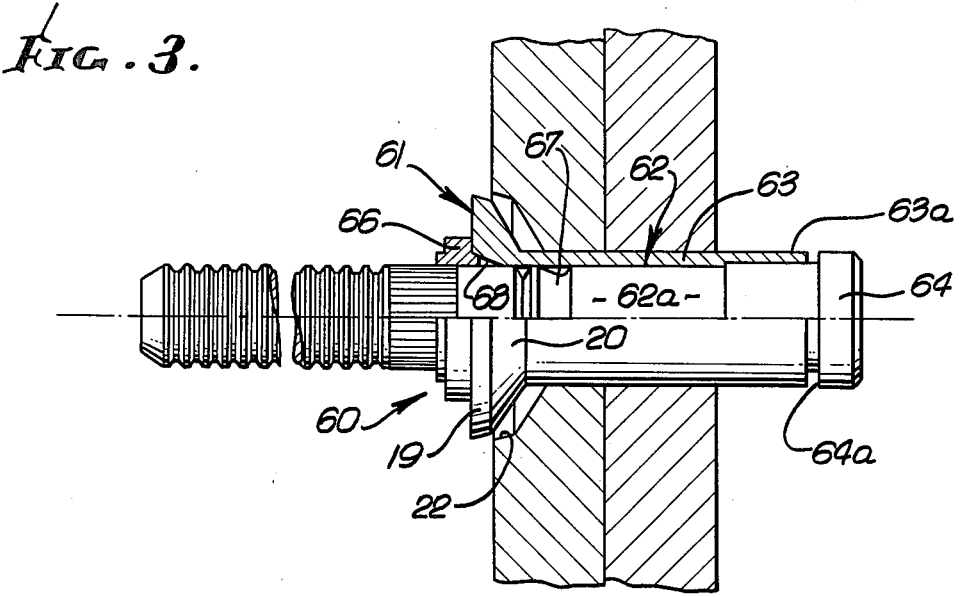
FIG. 3 is a side elevation, partly in section, showing a modified blind fastener incorporating the invention.
Figure 4:
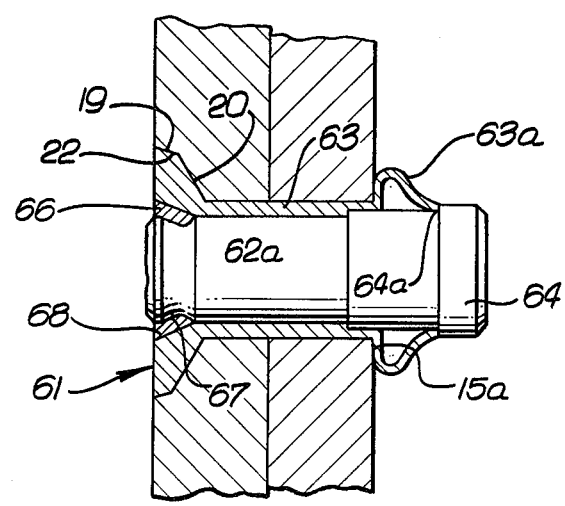
FIG. 4 is a sectional elevation of the FIG. 3 fastener after insertion into a work bore.

It will be noted that the three bearing areas (at 12 and 13, and at 22) act to position the fastener generally normal to the work as the latter is subjected to shear, to aid in resisting such shear, and to retain clamp-up In the fastener 60 of FIGS. 3 and 4, the structure of the annular head 61 remains the same as in FIGS. 1 and 2. Therefore, the same numbers are applied to the head and counterbore elements as in FIGS. 1 and 2, and seating of the head section 19 is tapered counterbore 22 is the same as previously described.

In this example, the extent 62a of the stem 62 within tubular shank 63 is not threaded, nor is the bore of the shank. The expansible means comprises a reduced wall thickness end portion 63a of the tubular shank, FIG. 4 showing that portion in buckled and expanded condition to axially retain the fastener in position. Buckled portion 63a engages the work surface 15a, as does the expanded ring portion 50a in FIG. 2. Flange 64 on the stem 62 has shoulder 64a engageable with shank end portion 63a to collapse same upon axial, rearward retraction of the stem relative to the shank. A locking collar 66 is deformed and wedges between groove 67 on the stem and the head tapered bore 68 to lock the stem to the head. Thus, collar 66 assists the interlock at 22, and the latter also assists locking of collar 66 in place.

Accordingly, applicant has solved the problems of loosening of blind fasteners and low fatigue life of work when such fasteners are used, by providing a blind fastener with a head that cooperates with the work to provide an anchor locus which aids in maintaining the fastener generally perpendicular to the work, and also clamp-up.

I claim:
1. In a tubular fastener having an axially extending tubular shank receivable in a work bore and an annular head receivable in forcible engagement with the work material forming a counterbore, and in combination with said work, the improvement comprising
(a) the head having an annular end face, a first forwardly tapered section located forwardly of said end face to forcibly engage the work counterbore and a second forwardly tapered section located forwardly of the first section, the taper angularity of the second section substantially exceeding the taper angularity of the first section,
(b) a stem extending through the tubular shank and head and
(c) means responsive to retraction of the stem toward the head end of the fastener to expand at the opposite end of the fastener and axially retain the fastener in position with the head first section forcibly engaging the counterbore,
(d) said forcible engagement of the head first forwardly tapered section with the work counterbore acting to create radial compression exerted on the stem to prevent loosening of the stem relative to the head and shank,
(e) the head first section having sufficient forcible engagement with the counterbore as to develop friction acting to block rotation of the head in response to torque application to the stem during said stem retraction, there being interference between said first section and counterbore between 0.001 and 0.010 inches,
(f) the taper angularity of the first section being greater than 2° and less than 15°, and the axial length of the first section being within the range 0.140 inches to 0.010 inches, said selected length increasing within said length range as said selected angularity decreases within said angle range, the entirety of said axial length being radially outwardly spaced of and from a taper formed by the head and spaced outwardly of the stem.

2. The fastener of claim 1 wherein the stem is rotatable during said retraction to apply torque transmitted from the rotating stem to the fastener head and shank, and including a flange shoulder carried on the stem proximate the end thereof remote from said head, said means comprises an expansible ring on and relatively rotatable about the stem and having engagement with the shoulder, and there being a cam on the shank to expand the ring in response to stem retraction, the outer diameter of said shoulder being less than the outer diameter of said head first section.

3. The fastener of claim 1 including an annular shoulder carried on the stem proximate the end thereof remote from the head, and said means comprises an axially collapsible shank tubular portion proximate said shoulder.

* * * * *